US011951821B2

(12) United States Patent
Terrat et al.

(10) Patent No.: US 11,951,821 B2
(45) Date of Patent: Apr. 9, 2024

(54) GEARBOX FOR AN ELECTRIC POWERTRAIN

(71) Applicant: Volvo Truck Corporation, Gothenburg (SE)

(72) Inventors: Jean Terrat, Malleval (FR); Thomas Barillot, Mornant (FR); Jan Hendriks, Västra Frölunda (SE)

(73) Assignee: Volvo Truck Corporation, Gothenburg (SE)

( * ) Notice: Subject to any disclaimer, the term of this patent is extended or adjusted under 35 U.S.C. 154(b) by 16 days.

(21) Appl. No.: 17/785,214

(22) PCT Filed: Dec. 19, 2019

(86) PCT No.: PCT/EP2019/086396
§ 371 (c)(1),
(2) Date: Jun. 14, 2022

(87) PCT Pub. No.: WO2021/121604
PCT Pub. Date: Jun. 24, 2021

(65) Prior Publication Data
US 2023/0050096 A1 Feb. 16, 2023

(51) Int. Cl.
*B60K 1/02* (2006.01)
*B60K 17/02* (2006.01)
(Continued)

(52) U.S. Cl.
CPC ............. *B60K 1/02* (2013.01); *B60K 17/08* (2013.01); *B60K 17/165* (2013.01); *B60K 17/02* (2013.01)

(58) Field of Classification Search
CPC ... B60K 1/02; B60K 1/17; B60K 1/08; B60K 1/165; F16H 2048/02–426;
(Continued)

(56) References Cited

U.S. PATENT DOCUMENTS 7,819,772 B2    10/2010  Tenberge
9,260,109 B2 *   2/2016  Tanaka ................. F16H 61/688
(Continued)

FOREIGN PATENT DOCUMENTS

CN    103072472 A  *  5/2013
CN    109677261 A     4/2019
(Continued)

OTHER PUBLICATIONS

International Search Report and Written Opinion for International Patent Application No. PCT/EP2019/086396, dated Sep. 29, 2020, 11 pages.
(Continued)

*Primary Examiner* — Tinh Dang
(74) *Attorney, Agent, or Firm* — Withrow & Terranova, PLLC (57) ABSTRACT

A gearbox for an electric powertrain, said gearbox comprising a primary shaft, on which are arranged a first primary gear which is fixed in rotation with respect to the primary shaft, a second primary gear and a third primary gear and a secondary shaft, on which are arranged a first secondary gear that is meshing with the first primary gear and that is by default free to rotate around the secondary shaft, a second secondary gear meshing with the second primary gear and a third secondary gear meshing with the third primary gear. The gearbox further includes a first coupling member, which is arranged along the secondary shaft and which can be moved between an engaged position, in which it couples the first secondary gear in rotation with the secondary shaft and a neutral position.

14 Claims, 8 Drawing Sheets

(51) Int. Cl.
  *B60K 17/08* (2006.01)
  *B60K 17/16* (2006.01)
(58) Field of Classification Search
  CPC ............ F16H 2200/0021; F16H 37/06; F16H 37/065; F16H 37/08; F16H 37/0806; F16H 2057/122
  See application file for complete search history.

(56) References Cited

U.S. PATENT DOCUMENTS

| | | | | |
|---|---|---|---|---|
| 2002/0189397 | A1* | 12/2002 | Sakamoto | B60W 10/10 74/661 |
| 2012/0304789 | A1* | 12/2012 | Misu | B60K 6/48 74/331 |
| 2015/0211607 | A1* | 7/2015 | Nakashima | B60K 6/48 74/661 |
| 2019/0078672 | A1 | 3/2019 | Duan et al. | |
| 2020/0116244 | A1 | 4/2020 | Mittelberger et al. | |

FOREIGN PATENT DOCUMENTS

| | | |
|---|---|---|
| DE | 102011110258 A1 | 12/2011 |
| DE | 102011002472 A1 | 7/2012 |
| DE | 102018129927 A1 | 6/2019 |
| EP | 3020588 A2 | 5/2016 |
| JP | 2003106384 A | 4/2003 |
| JP | 2015140127 A | 8/2015 |
| WO | 2018130101 A1 | 7/2018 |
| WO | 2018156706 A1 | 8/2018 |
| WO | 2018184808 A1 | 10/2018 |

OTHER PUBLICATIONS

Reasons for Rejection for Japanese Patent Application No. 2022536724, dated Oct. 6, 2023, 7 pages.

* cited by examiner

| Combination | EM 1 | EM 2 | Cruise gear |
|---|---|---|---|
| 1 | Gear 1 | Neutral | Neutral |
| 2 | Neutral | Gear 2 | Neutral |
| 3 | Gear 3 | Neutral | Neutral |
| 4 | Neutral | Gear 4 | Neutral |
| 5 | Gear 1 | Gear 2 | Neutral |
| 6 | Gear 1 | Gear 4 | Neutral |
| 7 | Gear 3 | Gear 2 | Neutral |
| 8 | Gear 3 | Gear 4 | Neutral |
| 9 | Neutral | Neutral | Engaged |

Fig. 10

GEARBOX FOR AN ELECTRIC POWERTRAIN

This application is a 35 USC 371 national phase filing of International Application No. PC T/EP2019/086396, filed Dec. 19, 2019, the disclosure of which is incorporated herein by reference in its entirety.

TECHNICAL FIELD

The invention concerns a gearbox for an electric powertrain.

Typically, the invention applies to a gearbox that is part of an electric powertrain integrated into a vehicle axle. Such electric axle (or "E-axle") is a front or rear axle that includes an axle body (or "housing") adapted to receive a powertrain, which is arranged to provide torque to the wheels of the axle. The "E-Axle" is a compact and economical electric drive solution for battery electric vehicles, fuel cells and hybrid applications. The electric motor(s), electronics and transmission are combined in a compact unit that directly drives the wheels provided at the longitudinal ends of the axle.

The invention can be applied in medium-duty and heavy-duty vehicles, such as trucks, buses and construction equipment, as well as in passenger cars. Although the invention will be described with respect to a truck, the invention is not restricted to this particular vehicle type. Indeed, the electric powertrain of the invention could also be used in watercrafts (ships, boats, etc.).

BACKGROUND

The transport industry is currently in the process of transition to electro-mobility, which is the use of electrical power to drive vehicles. Electro-mobility is mainly developed to meet increasingly stringent emission regulation requirements and the banning of internal combustion engine vehicles by some cities.

In order to free as much space as possible for batteries, chassis and other large parts, such as aerodynamic profiles, the powertrain must be as compact as possible.

Most electric motors have an ideal operating range that is achieved at high speed and low torque, while internal combustion engines have an ideal operating range that is achieved at low speed and high torque. In order to meet the torque demand at the wheels, typically for hill starts or high load starts, a relatively high reduction ratio (usually between 20 and 50) between the electric motor and the wheels is required. This reduction ratio can only be achieved with several reduction stages, which requires space.

The problem with using a gearbox with a fixed speed ratio is that the electric motor would run at high speed and low torque in cruise mode conditions and that in such conditions, the efficiency of the motor is not optimal. In addition, high-speed conditions also increase stresses on the gears, bearings and sealing rings of the transmission, which reduces the durability of the transmission.

In addition, a gearbox with gears rotating at high speed also creates lubrication problems: Indeed, a gear rotating too fast may not be lubricated properly since the oil between two successive teeth is ejected by centrifugal force and metal-to-metal contact may occur between the teeth of the two gears in mesh, which generates heat and, consequently, potentially irreversible mechanical damage.

High rotation speed is also generally creating more noise and vibrations. This can be problematic from regulation perspectives and for customers (both drivers and persons outside the vehicle).

It is to these disadvantages that the invention aims more particularly to remedy, by proposing a more compact and robust gearbox, and making it possible to ensure a better efficiency of the electric motor in many conditions by offering several gear ratios.

Existing solutions consist of adding a 3rd set of two gears to make a third ratio, as it is in a conventional gearbox. This makes the gearbox less compact and consequently does not enable a compact packaging in-between the wheels.

Another solution could be to increase the gearbox ratio to reduce the E-motor speed in cruise conditions and then suppress the need of a (third) cruise gear. However, it would have an impact on the performances at the start since the ratio in lowest gear might not be enough to start the vehicle, in particular in the field of heavy-duty vehicles.

Besides, WO 2018/156706 discloses (FIG. 3) an electric axle 200, which includes a drivetrain operably coupled to a differential assembly 232. The differential assembly 232 is drivingly connected to a gear pass 230. A first electric motor/generator 202 is drivingly connected a rotatable shaft 206. The electric axle 200 includes a second electric motor/generator 204 as well, which is drivingly connected to the shaft 206. The second electric motor/generator 204 and the first electric motor/generator 202 are positioned parallel to each other.

The shaft 206 has a selector spline 260 rotatingly attached thereto. A selector sleeve 262 slides on the selector spline 260 to engage a shaft 224a or a shaft 224b by means of a clutching action. Shafts 224a, 224b are hollow rotatable shafts co-axial with shaft 206. When neither shaft 224a nor shaft 224b is engaged, the selector sleeve 262 is in a neutral position.

At low speeds, high ratio range is desired: the selector spline 260 is engaged with shaft 224b. Power is transferred from the motor/generators 202, 204 through the selector spline 260 to an overrun clutch 266. The overrun clutch 266 automatically engages in low vehicle speed and will transfer power to shaft 224a, to a gear pass 230, to the differential assembly 232 and, thus, to the wheels 244a, 244b.

At high speeds, low ratio range is desired for regenerative braking: the selector spline 260 is engaged with shaft 224a. Regenerative power is transferred from the wheels 244a, 244b to the motor/generators 202, 204. The overrun clutch 266 disconnects to the hollow shaft 224b preventing gear pass 220, shaft 214 and gear pass 212 from spinning.

At certain desired road speeds, the selector sleeve 260 can be in a neutral positon wherein no power will be transferred through the shaft 206 to shaft 224b and gear pass 230 to the differential assembly 232 to the wheels 244a, 244b of the vehicle.

US 2019/0078672 A1 disclose a four-speed transaxle 10 for an electric vehicle, comprising four planetary gear sets that is operatively connected to an electric motor 11, four electric caliper brake systems 22, 31, 44 and 51 and one stage gears.

The first electric caliper brake system 22 is used to control a first carrier 17 in the first planetary gear set locked and released, the second electric caliper brake system 31 is used to control the second carrier 27 in the second planetary gear set locked and released, the third electric caliper brake system 44 is used to control the fourth carrier 38 in the fourth planetary gear set locked and released and the fourth electric caliper brake system 51 is used to control the fourth ring gear 39 in the fourth planetary gear set locked and released.

A first speed ratio is achieved by the second carrier 27 and the fourth ring gear 39 locked, the first carrier 17 and the fourth carrier 38 released. A second speed ratio is achieved by the first carrier 17 and the fourth ring gear 39 locked, the second carrier 27 and the fourth carrier 38 released. A third speed ratio is achieved by the second carrier 27 and the fourth carrier 38 locked, the first carrier 17 and the fourth ring gear 39 released. Eventually, a fourth speed ratio is achieved by the first carrier 17 and the fourth carrier 38 locked, the second carrier 27 and the fourth ring gear 39 released.

U.S. Pat. No. 7,819,772 B2 discloses a powershiftable multistage transmission LMG between an input shaft an, which can be connected to a first transmission shaft 1 and an output shaft ab as a second transmission shaft, comprising two shaft-lines WS1 and WS2 which are arranged in parallel in a transmission housing 0, three transfer gears SG between these shaft-lines, three planetary gears PG each with a sun gear So, a ring gear Ho and a planet-carrier Pt with single planets, and a plurality, preferably five, shifting elements SE. With only five shifting elements eight forward gears and one reverse gear can be switched.

Due to the distribution of the gear elements on two shaft-lines, the transmission gearbox has a short length and is suitable for front-cross-applications as well as inline-applications. All shifting elements can be easily fed with oil to control them. With only four shifting elements the transmission still has five well stepped forward gears and one reverse gear. The gear-trains 47 and 58 are very suitable gear elements to link to an electric motor to obtain an advantageous hybrid driveline.

However, none of the above documents discloses the particular arrangement of the gearbox according to the invention.

SUMMARY

The invention concerns a gearbox as defined in claim 1.

Thanks to the invention, the first primary gear (needed to make the reduction between a motor shaft and the primary shaft) is used both for receiving power in the gearbox and for transmitting said power to the secondary shaft via the first secondary gear. This enables to create a third gear ratio, called cruising ratio by adding only one gear instead of a set of two gears. Accordingly, this allows to save space, mass and consequently manufacturing costs.

The dependent claims define advantageous, but not mandatory, aspects of the gearbox.

The invention also concerns an electric powertrain. The dependent claims define advantageous, but not mandatory, aspects of the powertrain.

Finally, the invention concerns an electric, fuel cell or hybrid vehicle comprising such an electric powertrain.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
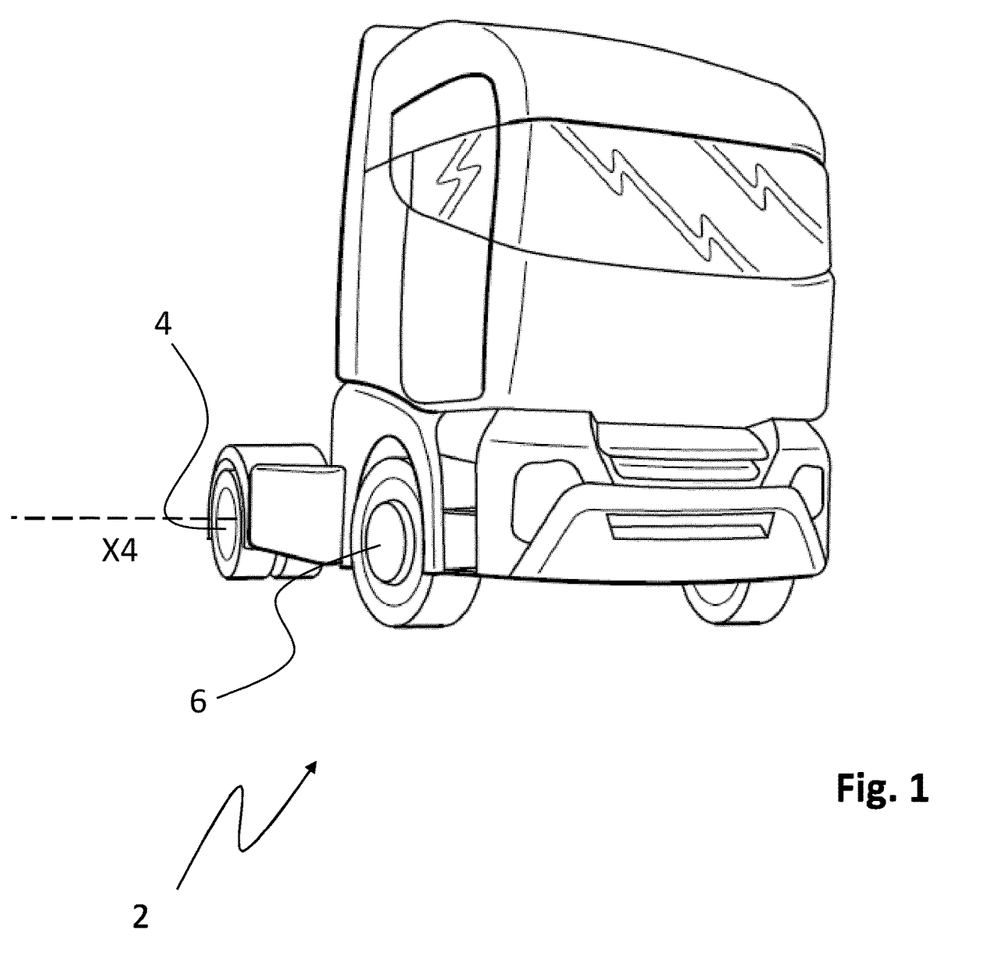
FIG. 1 is a perspective view of a vehicle, comprising a powertrain according to the invention, said powertrain being integrated into one of the axles of the vehicle, called "E-axle"

FIG. 1 shows a vehicle, which is an electric, fuel cell or hybrid vehicle, i.e. a vehicle using electric energy as a source of power. In the example, the vehicle is a truck 2, comprising two axles 4 and 6, respectively a front axle 6 and a rear axle 4.

Obviously, in an alternative embodiment, the vehicle may include one or more additional axle(s).

At least one of the two axles 4 and 6 is motorized, i.e. includes at least one electric motor. In the example, we consider that only the rear axle 4 is motorized, i.e. vehicle 2 is a propulsion vehicle (in which only the rear axle(s) is/are motorized). However, the invention obviously also applies to all-wheel drive vehicles and to traction vehicles (in which only the front axle(s) is/are motorized).

Axle 4 includes a powertrain 5, comprising a first electric motor (or "E-motor") EM1 and preferably a second electric motor EM2. In the example, the two motors EM1 and EM2 are identical, i.e. they have the same characteristics (supply voltage, operating current, torque-speed characteristic, etc.).

Advantageously, the electric motors EM1 and EM2 are AC type motors (synchronous or asynchronous). Alternatively, the electric motors EM1 and EM2 could be DC type motors as well (brushed). More generally, any electric motor is suitable.

Figure 2:
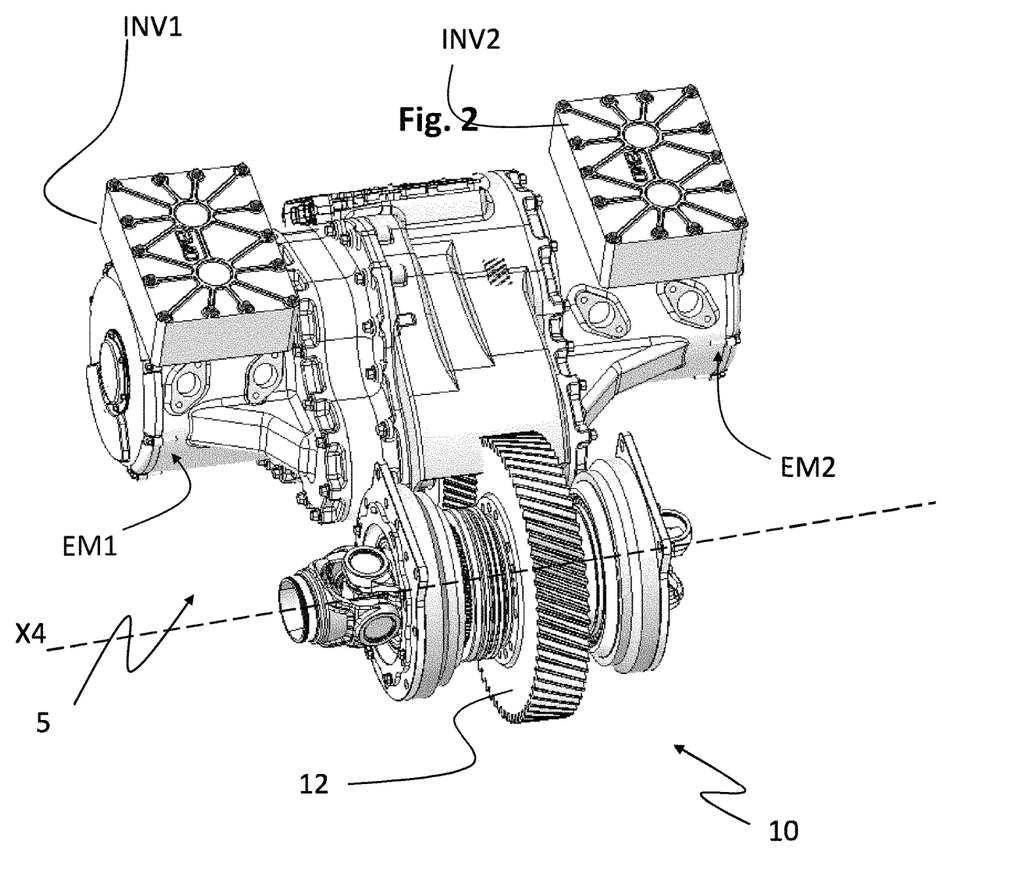
FIG. 2 is a perspective view of the powertrain integrated to the E-axle, said powertrain comprising a first electric motor and a gearbox according to a first embodiment of the invention, for transmitting the motor torque to the axle wheels.
Figure 3:
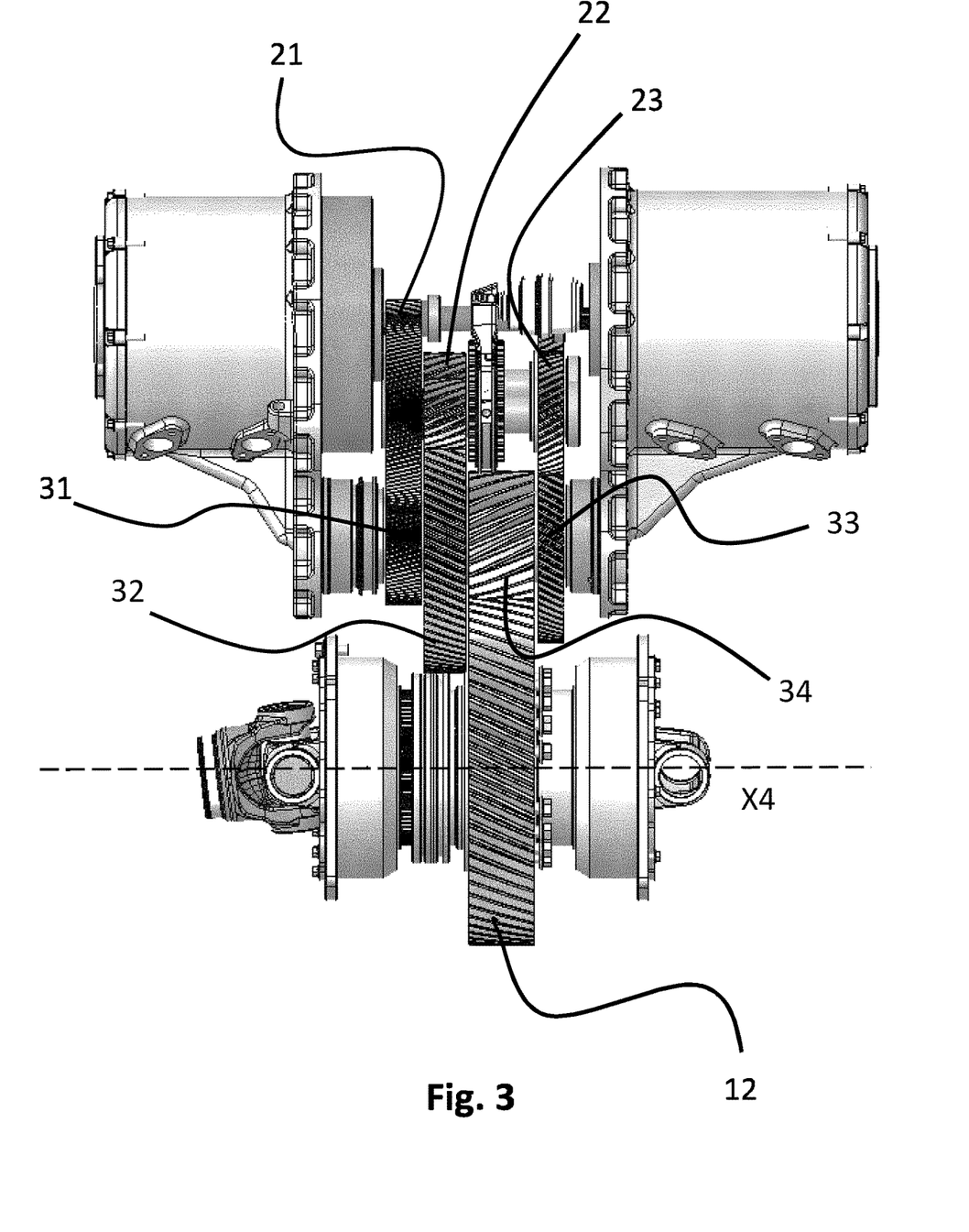
FIG. 3 is a top view of the powertrain of FIG. 2, in which a gearbox casing has been omitted to show the gearbox gears.

In the example of the figures, and as shown on FIG. 2, two inverters INV1 and INV2 are provided, one for each electric motor EM1 and EM2.

Preferably, the axle 4 has an elongated axle housing (not shown). This axle housing is hollow. It includes a central part inside which a differential 10 is received and two lateral parts extending on either side of the central part. The two lateral parts receive the two output shafts 42 and 44 respectively connected to the wheels W1 and W2 (See FIG. 4). Such axle housing is known as such, that is why it is not shown on the figures.

Typically, the motors EM1 and EM2 are attached to the axle housing by any appropriate means and in particular by bolting. Such fastening means are known as such, that is why they are not shown on the figures. Alternatively, the housing of the electric motors EM1 and EM2 is integral with the axle housing: Both housings are a single one piece.

Advantageously, the first electric motor EM1 and the second electric motor EM2 are offset from a longitudinal axis X4 of the axle 4.

Preferably, the axis of rotation of each electric motor EM1 and EM2 is parallel to the longitudinal axis X4 of axle 4. Accordingly, the powertrain 5 is said to be in a longitudinal configuration relative to the axle.

A gearbox (or transmission) G1, including a gear reduction mechanism, is provided between the first electric motor EM1 and the differential 10. The gearbox G1 includes a multiple speed ratio As shown on FIG. 4, the gearbox G1 includes a primary shaft 20 (also known as "input shaft"), on which are arranged a first primary gear 21 (also known as "gear ring" or "pinion") which is fixed in rotation with respect to the primary shaft 20, a second primary gear 22 and a third primary gear 23.

Figure 4:
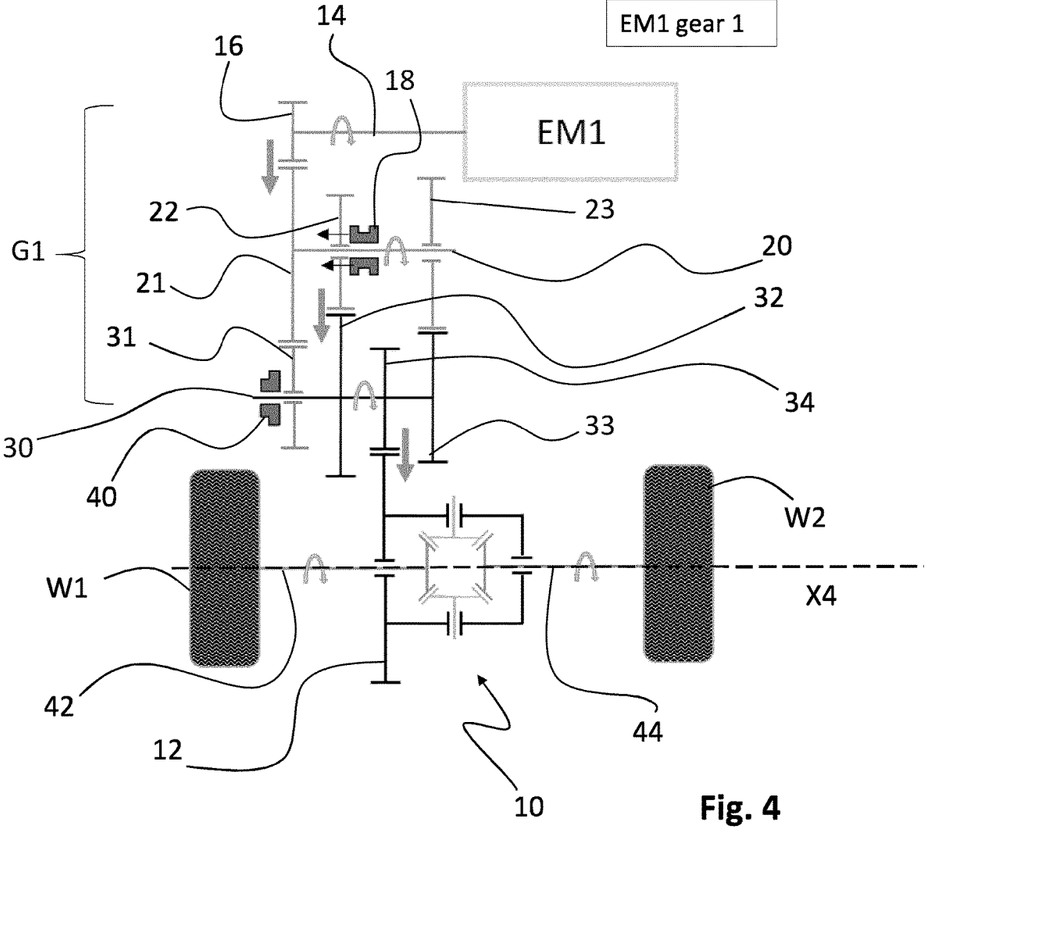
FIG. 4 is a schematic representation of the gearbox in a first configuration.

Gears 21, 22 and 23 have each a different (outer diameter) and/or a different number of teeth. Typically, Gear 21 has a diameter which is greater than that of gear 23 and gear 23 has a diameter that is greater than that of gear 22.

In the example, the first primary gear 21 is integral with shaft 20 (i.e. made in one-piece). However, the first primary gear 21 could be fixedly attached to shaft 20 as well, using fasteners, welding, splines or any other means. Besides, the second primary gear 22 and the third primary gear 23 are, in this particular arrangement, by default each free to rotate around primary shaft 20.

Typically, the second primary gear 22 is arranged between the first primary gear 21 and the third primary gear 23. However, other arrangements are possible: Typically, in one alternative embodiment, the third primary gear 23 could be arranged between the first and second primary gears 21 and 22.

Preferably, only three gears, which are the three gears 21, 22 and 23, are arranged on the primary shaft 20.

The gearbox G1 also includes a secondary shaft 30 (also known as "output shaft" or "countershaft"), on which are arranged a first secondary gear 31 that is meshing with the first primary gear 21 and that is by default free to rotate around the secondary shaft 30, a second secondary gear 32 meshing with the second primary gear 22 and a third secondary gear 33 meshing with the third primary gear 23.

Preferably, the second and third gears 32, 33 are each fixed in rotation with respect to said secondary shaft 30. In the example, the second and third gears 32, 33 are integral with shaft 30 (i.e. made in one-piece). However, the second and third gears 32, 33 could be fixedly attached to shaft 30 as well, using fasteners, welding, splines or any other means.

Typically, the second secondary gear 32 is arranged between the first secondary gear 31 and the third secondary gear 33.

Preferably, the primary shaft 20 and the secondary shaft 30 extend parallel to each other, offset along an axis perpendicular to their respective axis of rotation.

The gearbox G1 also includes a first coupling member 40 (also known as "gear shifting mechanism" or "dog clutch element"), which is arranged along the secondary shaft 30 and which can be moved between an engaged position (shown on FIG. 6), in which it (i.e. the coupling member 40) couples the first secondary gear 31 in rotation with the secondary shaft 30 and a neutral position (shown on FIGS. 4 and 5), in which it allows the gear 31 to rotate freely around the secondary shaft 30.

In the embodiment of the figures, the electric motors EM1 and EM2 are electronically controlled so as to perform a speed synchronization between a gear and a shaft before gear shifting, i.e. before coupling. However, and in a variant not shown, the gearbox G1 also includes at least one element for synchronizing the speed of the gear(s) with that of the shaft. Such synchronizing elements are known as such, that is why this variant is not further detailed herein.

The gearbox G1 also includes a second coupling member 18, which is arranged along one shaft among the primary and secondary shafts 20, 30, typically along shaft 20, and which is movable between a first position (shown on FIG. 5) in which it (i.e. the second coupling member 18) couples the second primary gear 22 in rotation with primary shaft 20, a second position (shown on FIG. 4) in which it couples the third primary gear 23 in rotation with primary shaft 20 and a neutral position (shown on FIG. 6) in which it does not prevent the second and third primary gears 22, 23 from rotating around primary shaft 20.

In one alternative embodiment (not represented), the second coupling member 18 could be arranged along the secondary shaft 30. In this case, the second coupling member 18 would be movable between a first position in which it (i.e. the second coupling member 18) would couple the second secondary gear 32 in rotation with secondary shaft 30, a second position in which it would couple the third secondary gear 33 in rotation with secondary shaft 30 and a neutral position in which it would not prevent the second and third secondary gears 32, 33 from rotating around secondary shaft 30.

Preferably, at least one of the first coupling member 40 and the second coupling member 18 (preferably both coupling members 18 and 40) is a dog clutch.

Advantageously, and as shown on FIG. 4, a first speed ratio ("EM1 gear 1") is obtained when the first coupling member 40 is in neutral position and when the second coupling member 18 is in the first position. In this configuration, the torque is transmitted from the primary shaft 20 to the secondary shaft 30 through the pair of gears 22 and 32. The other gears, i.e. gears 23 and 31, are respectively unclutched from shafts 20 and 30. This means that the rotation speed of gear 23 is independent from that of shaft 20 and that the rotation speed of gear 31 is independent from that of shaft 30. In other words, gears 23 and 31 are free to rotate around shaft 20 and 30, respectively. Nevertheless, it does not mean that gears 23 and 31 remain immobile: Gears 23 and 31 are respectively rotationally driven by gears 33 and 21, which are each fixed in rotation with shaft 30 and 20, respectively.

Figure 5:
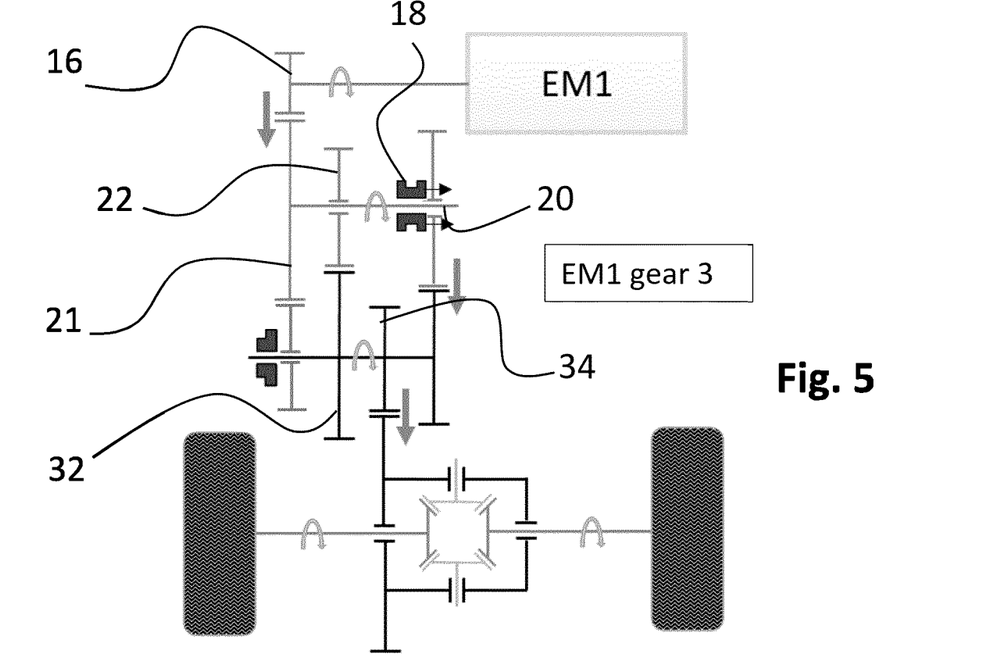
FIGS. 5 and 6 are schematic representations of the gearbox in a second and third configurations, respectively.

Advantageously, and as shown on FIG. 5, a second speed ratio ("EM1 gear 3"), different from the first speed ratio, is obtained when the first coupling member 40 is in neutral position and when the second coupling member 18 is in second position. In this configuration, the torque is transmitted from the primary shaft 20 to the secondary shaft 30 through the pair of gears 23 and 33. The other gears, i.e. gears 22 and 31, are respectively unclutched from shafts 20 and 30. This means that the rotation speed of gear 22 is independent from that of shaft 20 and that the rotation speed of gear 31 is independent from that of shaft 30. In other words, gears 22 and 31 are free to rotate around shaft 20 and 30, respectively. Nevertheless, it does not mean that gears 22 and 31 remain immobile: Gears 22 and 31 are respectively rotationally driven by gears 32 and 21, which are each fixed in rotation with shaft 30 and 20, respectively.

Figure 6:
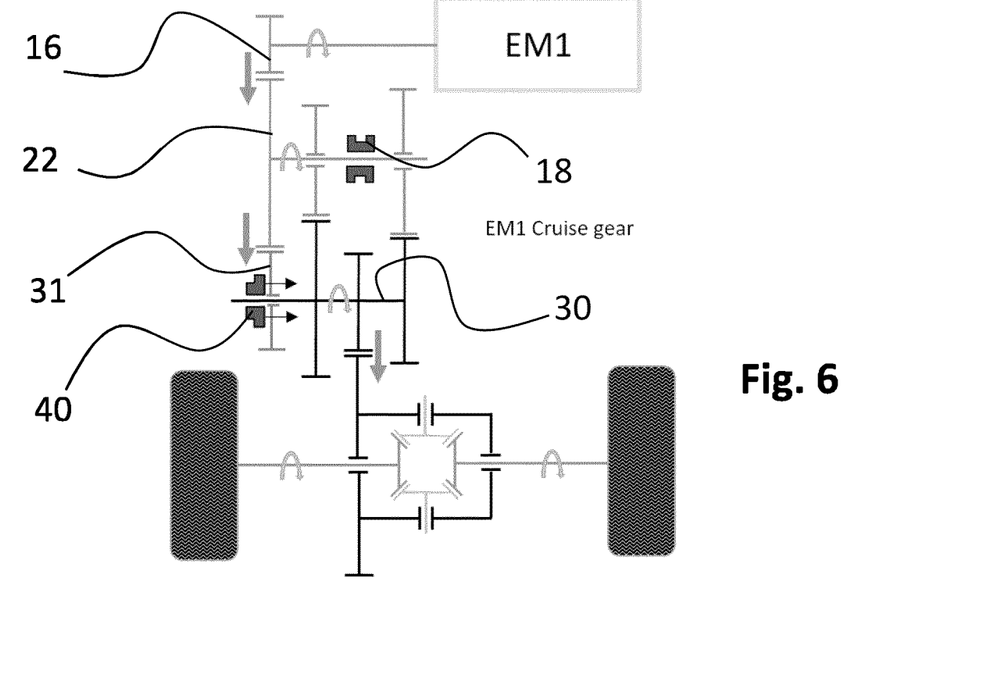

Advantageously, and as shown on FIG. 6, a third speed ratio ("EM1 cruise gear"), different from the first two speed ratios, is obtained when the first coupling member 40 is in the engaged position and the second coupling member 18 is in the neutral position. In this configuration, the torque is transmitted from the primary shaft 20 to the secondary shaft 30 through the pair of gears 21 and 31. The other gears, i.e. gears 22 and 23, are unclutched from shaft 20. This means that the rotation speeds of gears 22 and 23 are independent from the rotation speed of the shaft 20. In other words, gears 22 and 23 are free to rotate around shaft 20. Nevertheless, it does not mean that gears 22 and 23 remain immobile: Gears 22 and 23 are respectively rotationally driven by gears 32 and 33, which are fixed in rotation with shaft 30.

The speed ratio of gearbox G1 can be defined as the quotient between the rotational speed of the output gear 34 and the rotational speed of gear 16. In the particular arrangement of the figures, the first speed ratio is lower than the second speed ratio, which is, itself, lower than the third speed ratio (cruise gear ratio). Typically, the first speed ratio is about 1:16, the second speed ratio is about 1:10 and the third speed ratio is about 1:7.

Typically, the first speed ratio can be selected at low speeds, i.e. at vehicle start, the second speed ratio can be selected at medium speeds and the third speed ratio can be selected at high speeds It is to be understood that the transmission ratio of the gearbox G1 is automatically modified according to the vehicle speed.

In addition, if both coupling members 18 and 40 are put in neutral position, then no torque will be transmitted by the electric motor EM1 to the wheels.

In the example, the gearbox G1 therefore has at least three different speed ratios (three-speed gearbox). It is to be noted that only three gears are arranged on the primary shaft 20 of the gearbox G1, which is uncommon for a three-speed gearbox: Indeed, a three-speed gearbox usually includes an input shaft on which are arranged one input gear (to be connected to the driving source) and three distribution gears of different diameter to achieve the three speed ratios, i.e. fourth gears. This enables having a very compact gearbox, in particular in the longitudinal direction of the transmission.

In one alternative embodiment (not represented), the second and third secondary gears 32, 33 arranged along the secondary shaft 30 are by default each free to rotate around said secondary shaft 30. In this case, a third coupling member would be arranged along secondary shaft 30 and would be movable between a first position in which it would couple the second gear 32 in rotation with secondary shaft 30, a second position in which it would couple the third gear 33 in rotation with secondary shaft 30 and a neutral position in which the second and third gears 32, 33 can rotate around the secondary shaft 30. The advantage of having a third coupling member is that there is no need to lubricate the gear set 22, 32 or 23, 33 when it does not transmit any torque and that it limits oil splashing losses. This also reduces wear on the gears teeth, making the gearbox G1 more robust (or more durable).

Indeed, the third coupling member would allow to use only the pair of gears that transmit the torque (22 and 32 for instance) and to avoid that the other gears (23 and 33 for instance), which do not transmit any torque, rotate. When the second coupling member 18 is in neutral position, the third coupling member could also be put to neutral, so that none of the gears 22, 32, 23 and 33 would rotate.

Advantageously, a fourth gear 34 (also known as "output gear") is arranged on the secondary shaft 30, said fourth gear 34 being preferably fixed in rotation with the secondary shaft 30. The fourth gear 34 meshes with a crown wheel 12 of the differential 10.

Gears 31, 32, 33 and 34 have each a different (outer diameter) and/or a different number of teeth. Typically, Gear 32 has a diameter, which is greater than that of gear 33, gear 33 has a diameter that is greater than that of gear 31 and gear 31 has a diameter, which is greater than that of gear 34. However, in a variant not shown, the diameter of gear 34 can be higher than that of gear 33.

In the example, the fourth gear 34 is arranged axially between the second and third secondary gears 32, 33. However, in an alternative embodiment (not shown), the fourth gear 34 could be placed on the other side of gear 33, i.e. the side opposite gear 32. This would enable saving space for a third coupling member, as described above.

Therefore, only four gears, which are the gears 31 to 34, are arranged on the secondary shaft 30.

In the particular embodiment of the figures, the first electric motor EM1 comprises a motor shaft (or "rotor shaft") 14 on which is arranged a pinion 16 meshing with the first primary gear 21 of the primary shaft 20.

Typically, pinion 16 is fixed in rotation with motor shaft 14. For example, pinion 16 can be integral with shaft 14, meaning that pinion 16 and shaft 14 form a unique part.

The second electric motor EM2 is arranged to provide an additional torque to the wheel shafts 42 and 44, via the same or a separate gearbox. In the example of the figures, and as shown on FIG. 7, it is a different gearbox G2.

Figure 7:
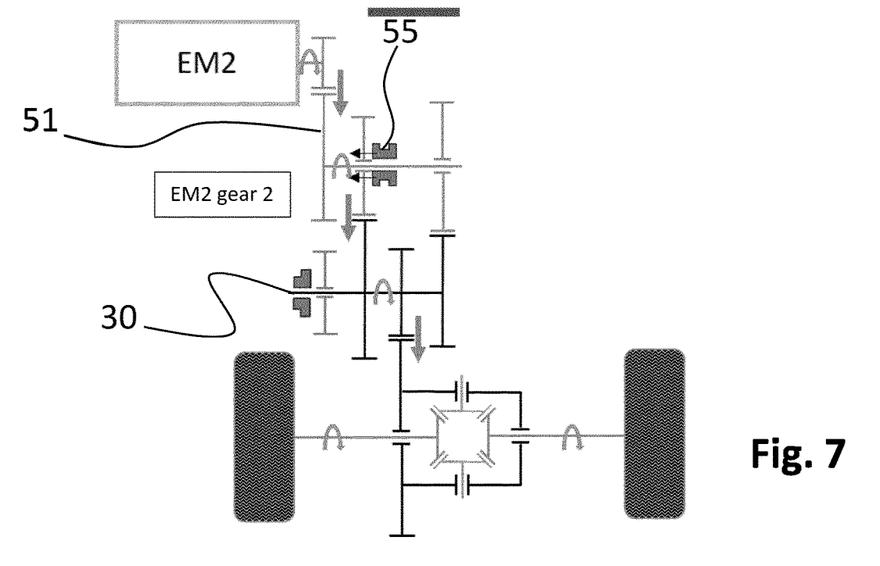
FIGS. 7 and 8 are schematic representations of a second gearbox of the E-axle, for transmitting the motor torque of a second electric motor to the axle wheels.

In practice, gearboxes G1 and G2 share a common gear stage. Typically, the secondary shaft (or output shaft) 30 is common to both gearboxes G1 and G2, which enables limiting the size of the assembly (compactness). It is then to be understood that both electric motors EM1 and EM2 share the same differential 10. In other words, the electric motors EM1 and EM2 are arranged so as to transmit a driving torque (or motor torque) to the wheel shafts 42, 44 via the crown wheel 12 of the differential 10. However, the gearbox G2 has its proper (or dedicated) input shaft 50.

In a way known per se, the differential 10 distributes the movement transmitted by the two motors EM1 and EM2 to the output shafts 42 and 44 linked to the wheel hubs, in proportion to the resistance torques encountered.

Typically, a first input gear 51, which is fixed in rotation with respect to the input shaft 50, a second input gear 52 and a third input gear 53 are arranged on the input shaft 50. In the example, the second input gear 52 and a third input gear 53 are by default free to rotate around the input shaft 50.

The second input gear 52 meshes with the second secondary gear 32 fitted on secondary shaft 30 and the third input gear 53 meshes with the third secondary gear 33. Contrary to the configuration of the first gearbox G1, the first input gear 51 does not mesh with the first secondary gear 31 fitted on shaft 30. However, in a variant not shown, the first input gear 51 could be meshing with the first secondary gear 31. In this case, gearbox G2 would have the same configuration than that of gearbox G1, i.e. would offer a third speed ratio (cruise speed ratio) as well.

In the particular embodiment of the figures, the second electric motor EM2 comprises a motor shaft on which is arranged a pinion 17 meshing with the first input gear 51 of the input shaft 50.

Gearbox G2 includes a coupling member 55 fitted on the input shaft 50, typically between the second and the third input gears 52 and 53. The coupling member 55 is movable between a first position (cf. FIG. 7: "EM2 gear 2") in which it couples the second input gear 52 in rotation with input shaft 50, a second position (cf. FIG. 8: "EM2 gear 4") in which it couples the third input gear 53 in rotation with input shaft 50 and a neutral position (not shown) in which it allows the second and third input gears 52, 53 to rotate freely around the input shaft 50.

Advantageously, and as shown on FIG. 7, a first speed ratio ("EM2 gear 2") is obtained when the coupling member 40 is in neutral position and when the coupling member 55 is in the first position. In this configuration, the torque is transmitted from the shaft 50 to the secondary shaft 30 through the pair of gears 52 and 32. The other gears, i.e. gears 53 and 31, are respectively unclutched from shafts 50 and 30. This means that the rotation speed of gear 53 is independent from that of shaft 50 and that the rotation speed of gear 31 is independent from that of shaft 30. In other words, gears 53 and 31 are free to rotate around shaft 50 and 30, respectively. Nevertheless, it does not mean that gears 53 and 31 remain immobile: Gears 53 and 31 are respectively rotationally driven by gears 33 and 21, which are each fixed in rotation with shaft 30 and 20, respectively.

Figure 8:
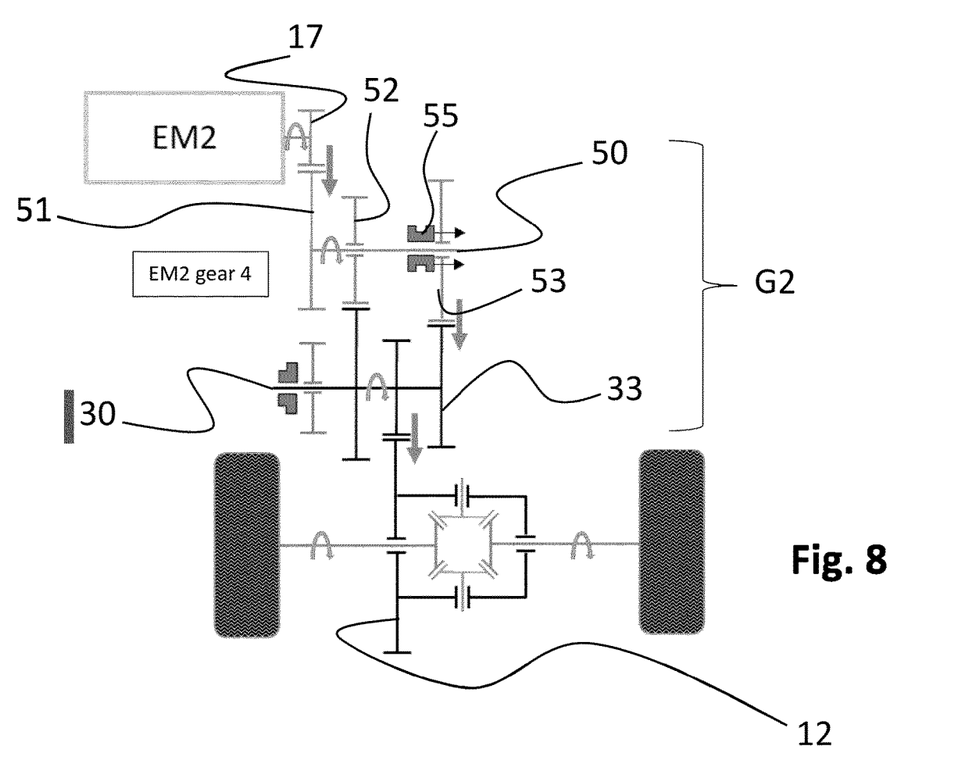

Advantageously, and as shown on FIG. 8, a second speed ratio ("EM2 gear 4") is obtained when the coupling member 40 is in neutral position and when the coupling member 55 is in the second position. In this configuration, the torque is transmitted from the shaft 50 to the secondary shaft 30 through the pair of gears 53 and 33. The other gears, i.e. gears 52 and 31, are respectively unclutched from shafts 50 and 30. This means that the rotation speed of gear 52 is independent from that of shaft 50 and that the rotation speed of gear 31 is independent from that of shaft 30. In other words, gears 52 and 31 are free to rotate around shaft 50 and 30, respectively. Nevertheless, it does not mean that gears 52 and 31 remain immobile: Gears 52 and 31 are respectively rotationally driven by gears 32 and 21, which are each fixed in rotation with shaft 30 and 20, respectively.

Besides, a neutral point can be obtained when both coupling members 40 and 55 are each in neutral position.

The speed ratio of gearbox G2 can be defined as the quotient between the rotational speed of the output gear 34 and the rotational speed of gear 17. Preferably, the first speed ratio of gearbox G2, which is about 1:10 is lower than the second speed ratio of gearbox G2, which is about 1:5. It is to be understood that gear shifting within the gearbox G2 is automatically achieved according to the vehicle speed.

Gearbox G2 is a two-speed gearbox, with a neutral point, in which no torque can be transmitted from the electric motor EM2 to the wheels W1 and W2.

In one alternative embodiment, the gearbox G2 can be replaced by a fixed reduction device (or transmission).

In one alternative embodiment (not shown), there is no differential 10. In this embodiment, the electric motor EM1 is arranged for transmitting a driving torque to wheel W1 only and the electric motor EM2 is arranged for transmitting a driving torque to wheel W2 only. Then, the rotation speed and the driving torque applied to each wheel are controlled independently. This solution is called "torque vectoring solution". Such "Torque vectoring solution" can also be achieved by using two powertrains, one for each wheel shaft 42 and 44. The two powertrains can be identical or different. In this case, the output gear of the gearbox directly meshes with a pinion arranged on a wheel shaft.

Preferably, the electric motors EM1 and EM2 and the associated transmission elements G1 and G2 are encased inside the axle housing. Alternatively, they could be outside of the axle housing: In this case, the housing would include standard interfaces to assemble the electric motors EM1 and EM2.

Preferably, the electric motors EM1 and EM2 are powered by an electrical power source, such as at least one battery or fuel cells, which are attached to another part of the vehicle, such as the chassis.

Figure 9:
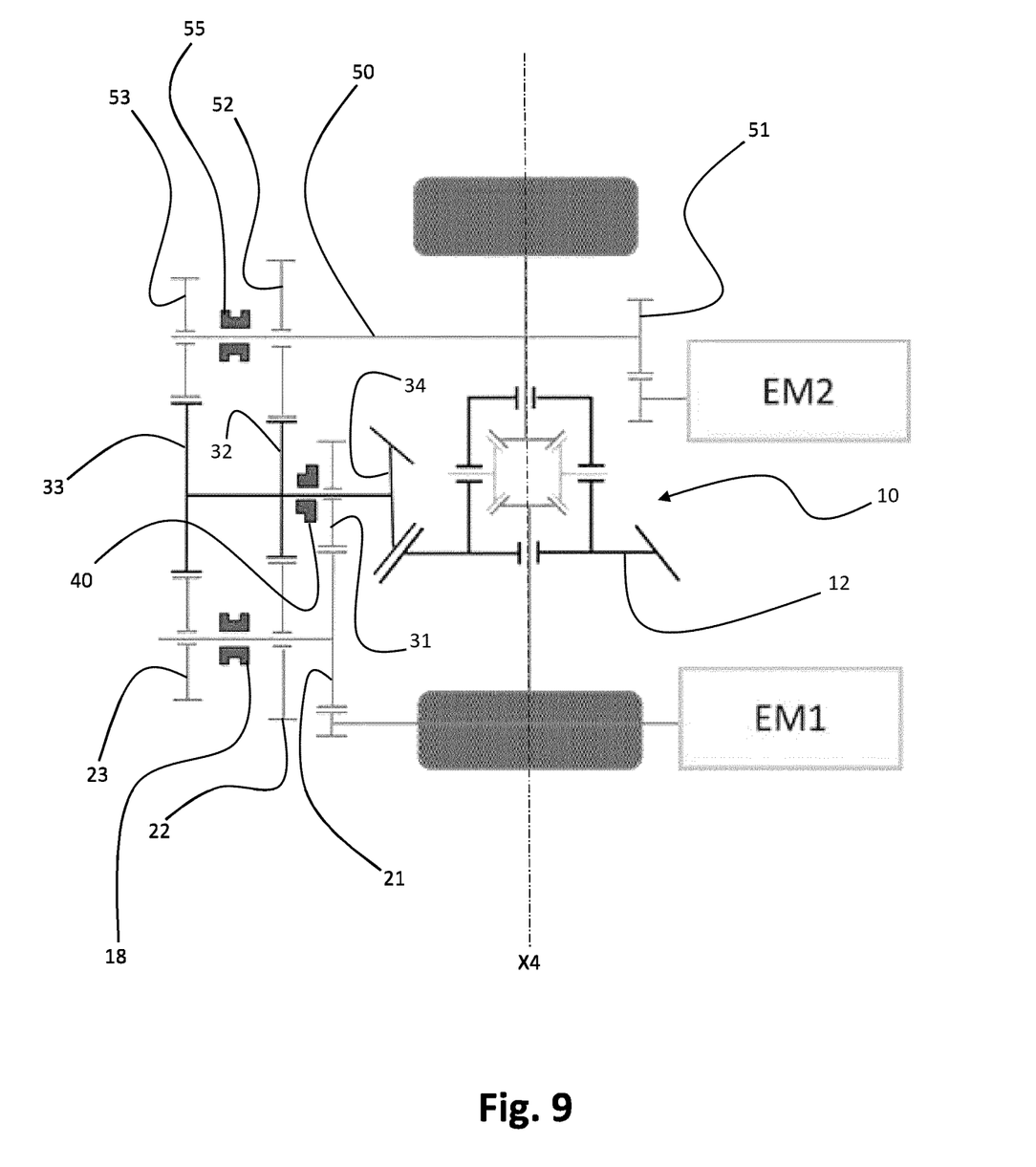
FIG. 9 is a schematic representation of a gearbox according to another embodiment of the invention.

FIG. 9 represents another embodiment of the invention. To be concise, only the differences with respect to the first embodiment are mentioned below.

In this other embodiment, the two electric motors EM1 and EM2 are arranged transverse relative to the axis of rotation X4 of the axle, meaning that the axis of rotation of each motor EM1 and EM2 is perpendicular to the axle longitudinal direction. Accordingly, the powertrain 5 is said to be in a transverse configuration relative to the axle. The advantage of such transverse configuration is that it quite compact in the longitudinal side in comparison with a longitudinal configuration. To the contrary, a longitudinal arrangement requires less space in the transverse direction.

The design of the powertrain, i.e. longitudinal or transverse, then depends on the concerned application.

Besides, the crown wheel 12 and the output gear 34 are conical gears (also called bevel gear). In addition, the first secondary gear 31 is arranged between the second secondary gear 32 and the output gear 34 and gear 32 is between gears 31 and 33, meaning that the output gear 34 is typically arranged at the end of shaft 30. This specific configuration is particularly suitable to arrange another coupling element (not shown) between gears 32 and 33, as mentioned above.

For the rest, the arrangement of the transmission represented on FIG. 9 is identical to that of FIGS. 1-8.

Figure 10:
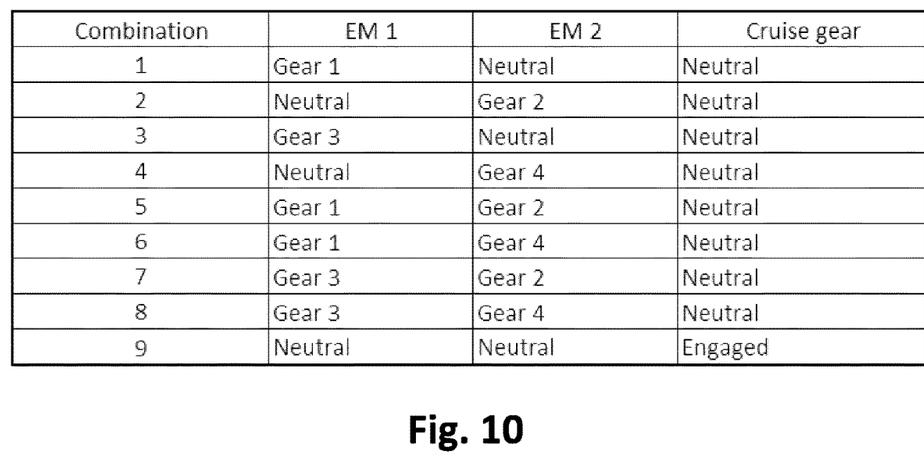
FIG. 10 is a table summarizing all possible operating modes of the powertrain that is part of the E-axle.

FIG. 10 shows all possible combinations provided by the powertrain 5. On this figure, the column "cruise gear" represents the engagement status of the first coupling member 40. When the "cruise gear" is engaged, the second coupling member 18 (and the coupling member 55, if any) is or are preferably in neutral position. However, in a variant, the coupling member 55 could be engaged in the first or second position while the cruise gear is engaged, i.e. while the first coupling member 40 is in engaged state.

Advantageously, the second electric motor EM2 or EM1 is controlled so as to provide an additional power during gear changes of the transmission element G1 or G2, respectively, so as to fully compensate for the power loss inherent in the gear change.

Preferably, the transmission ratios of gearbox G2 are different from that of gearbox G1. Typically, the first speed ratio of G1 ("EM1 gear 1") is lower than the first speed ratio of G2 ("EM2 gear 2"), the first speed ratio of G2 ("EM2 gear 2") is lower than the second speed ratio of G1 ("EM1 gear 3") and the second speed ratio of G1 ("EM1 gear 3") is lower than the second speed ratio of G2 ("EM2 gear 4"). The third speed ratio of G1, or "gear cruising ratio", is lower than the second speed ratio of G2 ("EM2 gear 4").

All in all, the two gearboxes G1 and G2 form together a multi-input transmission, capable of selectively transmitting the torque of E-motor EM1 and the torque of E-motor EM2 (as inputs of the transmission) to the wheels, typically through a differential (as output of the transmission).

It is to be understood that the present invention is not limited to the embodiments described above and illustrated in the drawings; Rather, the skilled person will recognize that many changes and modifications may be made within the scope of the appended claims. Typically, the powertrain 5 could be adapted to power any other type of vehicles, and in particular vehicles without wheels, such as watercrafts, military engines or construction equipment.

The invention claimed is:

1. A gearbox for an electric powertrain, the gearbox comprising:
   a primary shaft, on which are arranged a first primary gear which is fixed in rotation with respect to the primary shaft, a second primary gear, and a third primary gear;
   a secondary shaft, on which are arranged a first secondary gear that is meshing with the first primary gear and that is by default free to rotate around the secondary shaft, a second secondary gear meshing with the second primary gear, and a third secondary gear meshing with the third primary gear;
   a first coupling member, which is arranged along the secondary shaft and which can be moved between:

an engaged position, in which it couples the first secondary gear in rotation with the secondary shaft; and a neutral position, in which the first secondary gear can rotate around the secondary shaft; and a second coupling member, which is arranged along one shaft among the primary and the secondary shafts and which is movable between:

a first position in which it couples one of the second and third gears in rotation with the one shaft;

a second position in which it couples the other of the second and the third gears in rotation with the one shaft; and a neutral position in which the second and the third gears can rotate around the one shaft;

wherein the second and the third gears arranged along an other shaft, other than the one shaft, among the primary shaft and the secondary shaft are by default each free to rotate around the other shaft and wherein a third coupling member is arranged along the other shaft and is movable between:

a first position in which it couples one of the second and third gears in rotation with the other shaft;

a second position in which it couples the other of the second and third gears in rotation with the other shaft; and a neutral position in which the second and third gears can rotate around the other shaft.

2. The gearbox of claim 1, wherein the second and the third gears arranged along the other shaft among the primary shaft and the secondary shaft are each fixed in rotation with respect to the other shaft.

3. The gearbox of claim 1, wherein:

a first speed ratio is obtained when the first coupling member is in neutral position and the second coupling member is in first position;

a second speed ratio, different from the first speed ratio, is obtained when the first coupling member is in neutral position and the second coupling member is in second position; and a third speed ratio, different from the first two speed ratios, is obtained when the first coupling member is in the engaged position and the second coupling member is in the neutral position.

4. The gearbox of claim 1, in which the primary shaft and the secondary shaft extend parallel to each other, offset along an axis perpendicular to their respective axis of rotation.

5. The gearbox of claim 1, in which a fourth gear is arranged on the secondary shaft, the fourth gear being preferably fixed in rotation with the secondary shaft.

6. An electric powertrain for a vehicle, comprising at least one electric motor and the gearbox of claim 1, for transmitting a motor torque to at least one drive shaft.

7. The electric powertrain of claim 6, in which the gearbox is engaged with a differential distributing the motor torque to two drive shafts.

8. The electric powertrain of claim 6, wherein the electric motor comprises a motor shaft on which is arranged a pinion meshing with the first primary gear (of the primary shaft.

9. The electric powertrain of claim 6, comprising another electric motor, arranged to provide an additional torque to the at least one drive shaft, via the same gearbox or a separate gearbox.

10. The electric powertrain of claim 9, wherein the separate gearbox has a variable speed ratio and wherein the speed ratios of the separate gearbox are preferably each different from that of the gearbox.

11. The electric powertrain of claim 9, in which the two gearboxes, respectively of the two electric motors, are engaged with a common differential.

12. A vehicle, electric or hybrid, comprising the electric powertrain of claim 7.

13. An electric powertrain for a vehicle, comprising at least one electric motor and a gearbox for transmitting a motor torque to at least one drive shaft, the gearbox for an electric powertrain, the gearbox comprising:

a primary shaft, on which are arranged a first primary gear which is fixed in rotation with respect to the primary shaft, a second primary gear and a third primary gear;

a secondary shaft, on which are arranged a first secondary gear that is meshing with the first primary gear and that is by default free to rotate around the secondary shaft, a second secondary gear meshing with the second primary gear and a third secondary gear meshing with the third primary gear;

a first coupling member, which is arranged along the secondary shaft and which can be moved between:

an engaged position, in which it couples the first secondary gear in rotation with the secondary shaft; and a neutral position, in which the first secondary gear can rotate around the secondary shaft; and a second coupling member, which is arranged along one shaft among the primary and secondary shafts and which is movable between:

a first position in which it couples one of the second and third gears in rotation with the one shaft;

a second position in which it couples the other of the second and third gears in rotation with the one shaft; and a neutral position in which the second and third gears can rotate around the one shaft;

wherein the electric motor comprises a motor shaft on which is arranged a pinion meshing with the first primary gear of the primary shaft.

14. An electric powertrain for a vehicle, comprising at least one electric motor and a first gearbox for transmitting a motor torque to at least one drive shaft, the first gearbox comprising:

a primary shaft, on which are arranged a first primary gear which is fixed in rotation with respect to the primary shaft, a second primary gear and a third primary gear;

a secondary shaft, on which are arranged a first secondary gear that is meshing with the first primary gear and that is by default free to rotate around the secondary shaft, a second secondary gear meshing with the second primary gear and a third secondary gear meshing with the third primary gear;

a first coupling member, which is arranged along the secondary shaft and which can be moved between:

an engaged position, in which it couples the first secondary gear in rotation with the secondary shaft; and a neutral position, in which the first secondary gear can rotate around the secondary shaft; and a second coupling member, which is arranged along one shaft among the primary and secondary shafts and which is movable between:

a first position in which it couples one of the second and third gears in rotation with the one shaft;

a second position in which it couples the other of the second and third gears in rotation with the one shaft; and a neutral position in which the second and third gears can rotate around the one shaft;

wherein the electric powertrain comprises another electric motor, arranged to provide an additional torque to the at least one drive shaft, via a separate second gearbox, the second gearbox comprising a dedicated input shaft, the secondary shaft being common to the first gearbox and the second gearbox.

* * * * *